United States Patent
Chowdhury

[11] Patent Number: 5,493,995
[45] Date of Patent: Feb. 27, 1996

[54] COLLAPSING TEAT CUP LINER WITH TAPERING BARREL WALL

[75] Inventor: Mofazzal H. Chowdhury, Lenexa, Kans.

[73] Assignee: Alfa Laval Agri, Inc., Kansas City, Mo.

[21] Appl. No.: 243,376

[22] Filed: May 16, 1994

[51] Int. Cl.⁶ .................................................. A01J 5/06
[52] U.S. Cl. ............................... 119/14.54; 119/14.47; 119/14.51
[58] Field of Search .................. 119/14.47, 14.48, 119/14.49, 14.5, 14.51, 14.52, 14.53, 14.54

[56] References Cited

U.S. PATENT DOCUMENTS

| | | | |
|---|---|---|---|
| D. 327,552 | 6/1992 | Lallerstedt | D30/199 |
| 473,770 | 4/1892 | Murchland | 119/14.47 |
| 650,572 | 5/1900 | Hussey et al. | 119/14.48 X |
| 827,159 | 7/1906 | Lane | 119/14.49 |
| 870,785 | 11/1907 | Jacques | 119/14.47 X |
| 948,608 | 2/1910 | Andersen et al. | 119/14.47 |
| 974,834 | 11/1910 | Sharples | 119/14.49 |
| 998,856 | 7/1911 | Mitchell | 119/14.48 X |
| 1,073,538 | 9/1913 | Stephens | 119/14.47 X |
| 1,201,808 | 10/1916 | Dinesen | 119/14.49 |
| 1,231,166 | 6/1917 | Jenkins | 119/14.49 |
| 1,236,413 | 8/1917 | Droutlege | 119/14.49 X |
| 1,236,431 | 8/1917 | Hawley | 119/14.47 X |
| 1,239,923 | 9/1917 | Leitch | 119/14.49 X |
| 1,246,292 | 11/1917 | Macartney | 119/14.49 |
| 1,256,792 | 2/1918 | Harner | 119/14.47 |
| 1,260,466 | 3/1918 | Sharples | 119/14.49 X |
| 1,285,079 | 11/1918 | Eklundh et al. | 119/14.52 |
| 1,307,929 | 6/1919 | Saunders | 119/14.49 X |
| 1,337,211 | 4/1920 | Eklundh et al. | 119/14.49 |
| 1,388,380 | 8/1921 | Schmitt | 119/14.49 |
| 1,397,840 | 11/1921 | Maccartney | 119/14.49 |
| 1,425,584 | 8/1922 | Gessler | 119/14.49 |
| 1,476,788 | 12/1923 | Anderson | 119/14.49 |
| 1,513,189 | 10/1924 | Shippert | 119/14.47 |
| 1,538,731 | 5/1925 | Oden | 119/14.49 X |
| 1,574,265 | 2/1926 | Sutherland | 119/14.49 |
| 1,657,667 | 1/1928 | Ellison | 119/14.49 |

(List continued on next page.)

FOREIGN PATENT DOCUMENTS

| | | | |
|---|---|---|---|
| 1400559 | 6/1988 | U.S.S.R. | |
| 285233 | 3/1928 | United Kingdom | |
| 1197747 | 7/1970 | United Kingdom | 119/14.48 |
| 2053648 | 2/1981 | United Kingdom | 119/14.51 |

OTHER PUBLICATIONS

Drawing of a Hi Life Rubber Inc. Narrow Bore Inflation for Use with Full View Shell dated Aug. 21, 1984.

Primary Examiner—Robert P. Swiatek
Attorney, Agent, or Firm—Hovey, Williams, Timmons & Collins

[57] ABSTRACT

An elongated, flexible teat cup liner (10) of an improved design which can accommodate teats of varying lengths without fear of teat damage or inefficient machine milking. The liners (10) of the invention include an apertured mouthpiece (16) adjacent one end thereof, with an elongated, intermediate barrel (18) presenting an inwardly collapsible teat-receiving region (34) and a lowermost connecting tube (20) adapted for connection to a constant vacuum source, such as, e.g., a milk claw (54). The liners (10) of the present invention have a barrel wall (36) of gradually and progressively decreasing wall thickness for creating a differential resistance to inward collapse of the teat-receiving region of the barrel. The decrease in barrel wall (36) thickness assures a relatively high resistance to inward collapse at a first location adjacent the mouthpiece (16), and a gradual and progressive decrease in such resistance to inward collapse along an axial length of the teat receiving region (34) of the barrel (18). The connecting tube (20) includes a segment (60) intermediate the remote end of the liner (10) and the barrel (18) which is of reduced wall thickness to promote bending of the connecting tube (20) under the combined weight of the liner (10) and the attached shell (12) to thereby inhibit vacuum-drawn airflow through the central channel (32) when the mouthpiece (16) is unattached to an animal's teat.

2 Claims, 2 Drawing Sheets

U.S. PATENT DOCUMENTS

| | | | |
|---|---|---|---|
| 1,700,025 | 1/1929 | Cockburn | 119/14.49 |
| 1,701,072 | 2/1929 | Hapgood | 119/14.49 |
| 1,705,292 | 3/1929 | Horthy et al. | 119/14.47 |
| 1,705,293 | 3/1929 | Horthy et al. | 119/14.47 X |
| 1,816,116 | 7/1931 | Henrard . | |
| 1,871,520 | 8/1932 | Henrard | 119/14.47 |
| 1,896,321 | 2/1933 | Maes | 119/14.51 X |
| 1,916,839 | 7/1933 | Hulbert | 119/14.49 |
| 1,935,184 | 11/1933 | Hapgood | 119/14.49 |
| 1,955,810 | 4/1934 | Hodsdon | 119/14.49 |
| 1,959,581 | 5/1934 | Hapgood | 119/14.49 X |
| 2,055,718 | 9/1936 | Davis | 119/14.49 |
| 2,073,737 | 3/1937 | Ellison | 119/14.49 |
| 2,079,435 | 5/1937 | Dinesen | 119/14.52 |
| 2,099,884 | 11/1937 | Green | 119/14.51 |
| 2,120,556 | 6/1938 | Greene | 119/14.49 |
| 2,164,706 | 7/1939 | Flint et al. | 119/14.52 X |
| 2,219,945 | 10/1940 | Scott | 119/14.49 X |
| 2,302,443 | 11/1942 | Hodson | 119/14.49 X |
| 2,320,229 | 5/1943 | Frost | 119/14.49 |
| 2,334,481 | 11/1943 | Da Silveira | 119/14.47 |
| 2,402,094 | 6/1946 | Shurts et al. | 119/14.49 |
| 2,408,390 | 10/1946 | Gessler | 119/14.49 |
| 2,462,583 | 2/1949 | Weiby | 119/14.47 |
| 2,484,696 | 10/1949 | Dinesen . | |
| 2,574,063 | 11/1951 | Richwine | 119/14.49 |
| 2,621,626 | 12/1952 | Harris et al. | 119/14.52 |
| 2,622,559 | 12/1952 | Luth | 119/14.47 |
| 2,669,966 | 2/1954 | Skett | 119/14.49 |
| 2,687,112 | 8/1954 | Shurts | 119/14.49 |
| 2,694,379 | 11/1954 | Hein | 119/14.47 |
| 2,744,496 | 5/1956 | Röben | 119/14.47 |
| 2,853,971 | 9/1958 | Bajema | 119/14.52 |
| 2,896,573 | 7/1959 | Schalm et al. | 119/14.49 X |
| 2,935,964 | 5/1960 | Pickavance et al. | 119/14.47 X |
| 2,944,514 | 7/1960 | Nesseth | 119/14.47 X |
| 2,947,282 | 8/1960 | Brown | 119/14.47 |
| 2,986,117 | 5/1961 | Ronaldson | 119/14.47 X |
| 2,997,980 | 8/1961 | Noorlander | 119/14.52 |
| 3,079,891 | 3/1963 | Miller | 119/14.51 X |
| 3,096,740 | 7/1963 | Noorlander | 119/14.52 |
| 3,102,418 | 9/1963 | Schalm et al. . | |
| 3,106,445 | 10/1963 | Cline | 119/14.47 X |
| 3,148,661 | 9/1964 | Lindsey | 119/14.5 |
| 3,149,609 | 9/1964 | Noorlander | 119/14.18 |
| 3,234,906 | 2/1966 | Jensen | 119/14.49 X |
| 3,272,179 | 9/1966 | Troberg | 119/14.49 |
| 3,289,634 | 12/1966 | Simons | 119/14.52 |
| 3,308,788 | 3/1967 | Noorlander | 119/14.47 X |
| 3,324,830 | 6/1967 | McAndrew | 119/14.52 |
| 3,401,672 | 9/1968 | Berglind | 119/14.49 |
| 3,474,760 | 10/1969 | Siddall et al. | 119/14.49 |
| 3,476,085 | 11/1969 | Noorlander | 119/14.49 X |
| 3,485,212 | 12/1969 | McAndrew | 119/14.49 |
| 3,550,557 | 12/1970 | Goldsmith | 119/14.49 X |
| 3,557,755 | 1/1971 | Close | 119/14.47 X |
| 3,589,194 | 6/1971 | Noorlander | 119/14.14 X |
| 3,611,993 | 10/1971 | Norton | 119/14.47 X |
| 3,659,557 | 5/1972 | Noorlander | 119/14.47 X |
| 3,659,558 | 5/1972 | Noorlander | 119/14.49 X |
| 3,661,120 | 5/1972 | Siddall et al. | 119/14.49 |
| 3,696,790 | 10/1972 | Albright | 119/14.47 |
| 3,771,494 | 11/1973 | Mills | 119/14.47 |
| 3,818,867 | 6/1974 | Strange-Hansen | 119/14.47 |
| 3,874,338 | 4/1975 | Happel | 119/14.53 |
| 3,931,795 | 1/1976 | Duncan | 119/14.49 X |
| 3,934,550 | 1/1976 | Worstroff | 119/14.02 |
| 3,967,586 | 7/1976 | Noorlander | 119/14.53 |
| 3,967,587 | 7/1976 | Noorlander | 119/14.49 |
| 3,973,521 | 8/1976 | Duncan | 119/14.47 |
| 4,059,070 | 11/1977 | Siddall et al. | 119/14.47 |
| 4,116,165 | 9/1978 | Arrington | 119/14.47 |
| 4,141,319 | 2/1979 | Maier et al. | 119/14.47 |
| 4,196,696 | 4/1980 | Olander | 119/14.51 |
| 4,223,635 | 9/1980 | Akerman | 119/14.47 X |
| 4,249,481 | 2/1981 | Adams | 119/14.52 X |
| 4,269,143 | 5/1981 | Erbach | 119/14.49 |
| 4,280,446 | 7/1981 | Noorlander | 119/14.49 |
| 4,315,480 | 2/1982 | Noorlander | 119/14.49 |
| 4,320,718 | 3/1982 | Hoefelmayr et al. | 119/14.47 |
| 4,332,215 | 6/1982 | Larson | 119/14.49 |
| 4,352,234 | 10/1982 | Noorlander . | |
| 4,372,250 | 2/1983 | Larson | 119/14.47 |
| 4,403,568 | 9/1983 | Fukuhara et al. | 119/14.54 X |
| 4,425,872 | 1/1984 | Mills | 119/14.52 X |
| 4,441,454 | 4/1984 | Happel et al. | 119/14.52 X |
| 4,441,455 | 4/1984 | Lowry et al. | 119/14.47 |
| 4,457,262 | 7/1984 | Mills | 119/14.47 |
| 4,459,938 | 7/1984 | Noorlander | 119/14.49 |
| 4,459,939 | 7/1984 | Noorlander | 119/14.49 |
| 4,483,272 | 11/1984 | Tonelli | 119/14.47 X |
| 4,530,307 | 7/1985 | Thompson | 119/14.49 |
| 4,572,106 | 2/1986 | Mills | 119/14.52 X |
| 4,604,969 | 8/1986 | Larson | 119/14.49 X |
| 4,610,220 | 9/1986 | Goldberg et al. | 119/14.47 |
| 4,648,350 | 3/1987 | Noorlander | 119/14.47 X |
| 4,651,676 | 3/1987 | Kupres | 119/14.47 |
| 4,745,881 | 5/1988 | Larson | 119/14.51 |
| 4,756,275 | 7/1988 | Larson | 119/14.49 |
| 4,840,141 | 6/1989 | Marshall | 119/14.47 |
| 4,846,108 | 7/1989 | Meermoller | 119/14.47 |
| 4,941,433 | 7/1990 | Hanauer | 119/14.54 X |
| 4,964,368 | 10/1990 | Ball et al. | 119/14.49 |
| 5,007,378 | 4/1991 | Larson | 119/14.47 |
| 5,069,162 | 12/1991 | Thompson et al. | 119/14.47 |
| 5,215,036 | 6/1993 | Petterson et al. | 119/14.47 |

5,493,995

COLLAPSING TEAT CUP LINER WITH TAPERING BARREL WALL

BACKGROUND OF THE INVENTION

1. Field of the Invention

The present invention is concerned with a teat cup liner or inflation for a milking machine. The liner hereof is designed for "bottom-up" collapsing around the bottom of animal teats of various lengths by the provision of differential resistance to collapse in a teat-receiving region adjacent the mouthpiece of the liner. Further, the liner hereof is intended to reduce the flow of vacuum-drawn air therethrough after detachment from the teat.

2. Description of the Prior Art

In typical dairy applications, conventional automatic milking machines utilize a plurality of teat cup assemblies connected to a common milk claw. Each teat cup assemblies includes a hollow outer shell or cup attached to a pulsation line which typically alternates between a vacuum and atmospheric pressure. An inflation or teat cup liner is provided within the teat cup and extends axially along the length thereof. The liner includes a mouthpiece, a barrel positioned within the teat cup, and a connecting or short milk tube which connects to the claw. A constant vacuum is drawn through the claw and liner to extract milk from the liner during milking, thus the interior milk and vacuum conveying channel within the liner is maintained at constant subatmospheric conditions.

During milking, the annular region between the cup and the liner is subjected to alternating subatmospheric and a higher, typically atmospheric pressure, while the mouthpiece is positioned in sealing engagement with the teat. The barrel wall alternately flexes inwardly toward the teat in the teat-receiving region of the barrel and relaxes to a generally straightened position during respective application of elevated pressure and subatmospheric pressure. This alternating pressure in the annular region effectively causes the barrel wall to massage the teat and thereby promote the extraction of milk Through the barrel and into the claw.

It is important that the upper portion of the teat-receiving region of the liner grip the teat firmly to prevent vacuum loss and disengagement of the teat cup assembly from the cow's teat. Loss of vacuum around the mouthpiece lips results in inefficient milking.

One problem associated with dairy production is the care of the teats of the animals to be milked. Cows and other dairy animals may develop mastitis or chapping of the teats if the liner is improperly sized or fails to collapse around the end of the teat. While this collapsing of the liner is not so complete as to shut off the flow of milk, it is believed important to the health of the animal that the liner does collapse around the teat to prevent prolonged exposure to vacuum.

These problems are exacerbated by the fact that cows and other dairy animals have teats of varying lengths. This variance may be pronounced when different breeds are milked in the same herd, and may exist to a lesser degree even in cows of the same breed. Changes in teat size also occur during the exposure to vacuum in the milking process. These variations in size make it very difficult to produce a universal teat cup liner capable of conforming to the teats of a wide variety of cows during milking. These and other attempts to improve udder health and milk production account for the very large number of liner designs which have been proposed in the past. Unfortunately, these designs have all been deficient in one or more respects, and the goal of a truly universal liner has heretofore eluded workers in the art.

A principal difficulty in producing a universal liner stems form the fact that virtually all prior designs are constructed so as to collapse at a predetermined intermediate region along the length of the barrel. While such a design may accommodate certain sixes of teats, cows having longer teats cannot properly be milked with these liners. Any attempt to use an improperly sized liner may lead to excessive teat cup crawl during milking, teat chapping and a tendency to induce mastitis.

U.S. Pat. No. 3, 289,634 discloses a teat cup liner having upper and lower barrel sections of differential thickness, with the upper portion of the barrel being thicker. An abrupt step or shoulder is provided between the upper and lower regions of the liner barrel, which insures that collapse occurs at the lower, thinner region of the barrel. However, this design cannot properly accommodate teats of varying length. That is, while the design may be satisfactory for use on cows or other animals having teat lengths corresponding to the predetermined design, it may be totally useless or even damaging when used on cows having longer teats. Furthermore, this design is deficient in that it does not efficiently accommodate teat lengthening during the milking process. Similar constructions are described in U.S. Pat. Nos. 3,096, 740 and 4,269,143. In both of these patents, use is made of an externally applied sleeve disposed about the liner barrel. Each construction also includes a lower radial shoulder which engages the lower margins of the external sleeves, thereby insuring inward collapse of the liners at predetermined locations.

A further problem encountered during milking is the need to prevent excessive loads on the vacuum pump once the liner has become detached from the teat. Absent some control, the vacuum pump must increase its work to maintain vacuum in the milk line to the claws and teat cups remaining on the animals when air is free to flow through a detached teat cup after milking. On the other hand, if the teat cup remains on the animal for an extended period after the release of milk is complete, teat damage may result. The prior art has typically attempted to solve this problem by allowing the inner wall of the connecting tube of the liner to drape over the short milk nipple on the claw to thereby close the opening at the end of the short milk ripple and effectively seal the connecting tube. However, this presents certain disadvantages because of the need to scarf and round the end of the short milk nipple which adds cost and may reduce milk flow at this point, and the occasional puncturing of the connecting tube by sharp points or edges on the end of the short milk nipple. Further, when the "cut-off" is located too close to the remote end of the liner, the mouthpiece, may drag along the ground when dangling from the claw, resulting in aggravating sanitation problems.

There is thus accordingly a decided need in the art for an improved teat cup liner which can properly receive teats of varying lengths, both initially and during the milking process, in order to permit efficient milking of a wide variety of cows while avoiding the problems inherent in improperly fitted teat cup liners. There also a need for a convenient way to reduce vacuum flow through the interior of a teat cup liner not attached to the teat of a cow or other dairy animal.

SUMMARY OF THE INVENTION

The present invention largely solves the problems presented above by proving an elongated, flexible teat cup liner of truly universal design, which can accommodate teats of varying sizes of dairy animals. Furthermore, the liner of the present invention presents a virtually automatic gravity operated vacuum shut-off after detachment of the liner from the teat of the animal.

Broadly speaking, the teat cup liner of the present invention includes the usual, normally uppermost apertured mouthpiece adjacent one end thereof, with an elongated, intermediate barrel presenting an inwardly collapsible, teat-receiving region, and with a connecting or short milk tube adjacent the other end of the liner adapted for connection with a vacuum source. The liner of the invention is improved by the wall construction which creates a differential resistance to inward collapse of the teat-receiving region along the length thereof, with a relatively high resistance to inward collapse at a first location on the barrel adjacent the mouthpiece and a gradual and progressive decrease in barrel wall thickness to provide a corresponding progressive decrease in resistance to inward collapse along an axial length of the teat-receiving region of the barrel.

The present invention thus teaches away from the conventional practice of creating a teat cup liner which is either of the same thickness along the length of the teat-receiving region, is designed to provide increased reinforcement at the portion of the teat-receiving region where the end or tip of the teat is positioned, or is of a "stepped" external reinforcement which does not provide a true conformation to teats of different lengths. Because the present invention presents a gradual and progressive decrease in wall thickness in an axial direction from the mouthpiece toward the connecting tube, the liner hereof may readily conform to the teats of different animals, and maintain that conformation even during moderate slippage of the liner relative to the teat.

In addition, the teat cup liner hereof is advantageously provided with a connecting tube beyond the teat receiving region including a segment of reduced wall thickness. This segment is positioned intermediate the remote end of the connecting tube and the junction between the barrel and the connecting tube. The segment thus presents a zone of relative weakness promoting bending of the connecting tube at the segment when the teat cup assembly is not affixed to the animal's teat. The weight of the teat cup assembly and the length of the barrel, mouthpiece and the portion of the connecting tube proximate thereto define a moment arm which causes the milk and vacuum conveying channel extending within the liner to collapse when the liner bends at the segment. Advantageously, this substantially reduces the flow of air passing through the channel when the teat cup assembly is attached to the milking claw but not attached to the animal's teat. The effect of gravity makes this simple but effective solution to reduce unproductive and unnecessary work by the vacuum pump virtually automatic.

These and other objects and benefits of the present invention will be readily appreciated by those skilled in the art with reference to the drawings and written specification which follows.

DESCRIPTION OF THE PREFERRED EMBODIMENT

Figure 3:
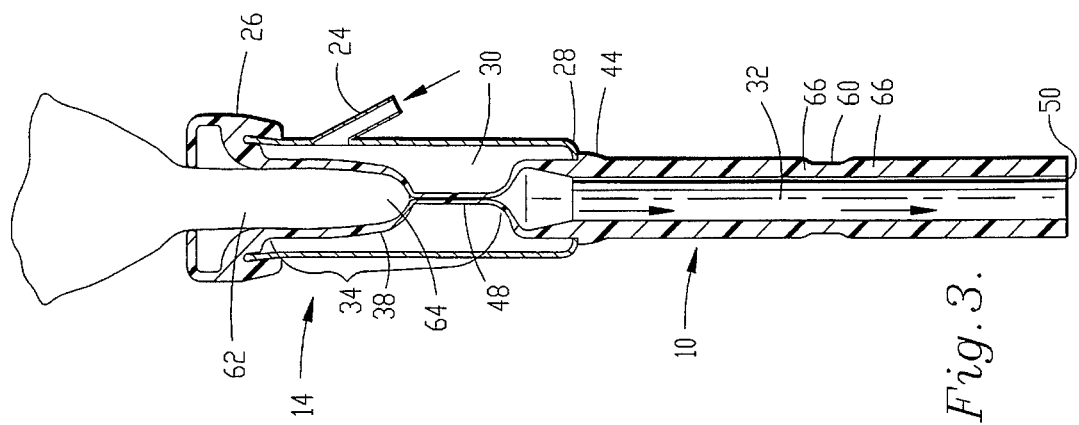
FIG. 3 is a vertical cross-sectional view similar to FIG. 2, but showing the liner in a collapsed condition during a pulsation cycle.

Referring now to the drawing, a teat cup liner 10 in accordance with the present invention is adapted for use with a teat cup or shell 12, the liner 10 and the shell 12 comprising a teat cup assembly 14 for use in milking the teats of dairy animals such as cows or goats. The liner 10 is of a flexible, resilient and preferably integrally molded and thus of unitary construction of latex or synthetic rubber and broadly includes a mouthpiece 16, a barrel 18 and a connecting tube 20. The shell 12 contrasts with the liner 10 in that it is typically made of a rigid material such as stainless steel or possibly rigid synthetic resins, and includes a substantially cylindrical shell wall 22 which is normally oriented in an upright position during use.

As is conventional, a short pulse tube connector 24 is positioned on the shell wall 22 to provide the necessary connection for providing alternating vacuum and atmospheric pressure to the shell 12 during milking. The shell wall 22 includes an upper margin 26 located in sealing engagement with the liner 10 at the mouthpiece or adjacent portion of the barrel, and a lower margin 28 sealingly engageable with the adjacent portion of the barrel or connecting tube. An annular pulsation chamber 30 is defined between the shell 12 and the liner 10 between the areas of sealing engagement, while an axially extending milk and/or vacuum conveying channel 32 is located within the liner and extends substantially the length thereof.

In the liner 10 of the present invention, the barrel 18 includes an axially extending teat-receiving region 34. This region 34 may extend substantially the length of the barrel, or only a portion thereof, depending on such factors as the dimensions of the liner 10 and the anticipated length of the animal's teat during milking.

The barrel 18 includes a barrel wall 36, and the portion 38 within the teat-receiving region 34 has a wall thickness T which is greater at the upper part 40 of the portion 38 adjacent the mouthpiece and gradually and progressively narrows or tapers in a direction toward the lower part 42 of the portion adjacent the junction 44 with the connecting tube 20. In this regard, it is important to proper adaptability of the liner 10 to various teat lengths that the tapering be both gradual and progressive, whereby the resistance to collapse will gradually increase from the bottom of the liner 10 upward along the length of the teat-receiving region. This promotes effective conformation of the liner 10 around the end 64 of the cow's teat 62 during the collapse portion of the pulsation cycle.

To effect this object, it is important that no step-like increase in thickness be presented which would cause a predetermined point of collapse to be established. Rather, the portion 38 which includes a gradual and progressive tapering of the barrel wall 36 must extend at least about three and preferably at least about four times the inner diameter D of the barrel 18 in the corresponding teat-receiving region 34. Preferably, the wall thickness T tapers about 0.5 mm along the length, with a range of wall thickness from about 4.0 mm tapering to 3.5 mm for thicker wall liners with greater resistance to collapse, to a range of 2.0 mm tapering to 1.5 mm for the thinnest barrel walls 36, when the material is a natural latex or synthetic rubber liner 10. In preferred embodiments, the barrel wall will present a smooth inner surface 46 along the teat-receiving region and may also have a smooth outer surface 48 along the teat-receiving region. Typically, the length of the barrel 18 would be, for example, about 114 mm and the diameter D about 20 mm for a typical dairy cattle liner 10, although this could vary according to the specific animal, herd characteristics or milking methods.

Figure 4:
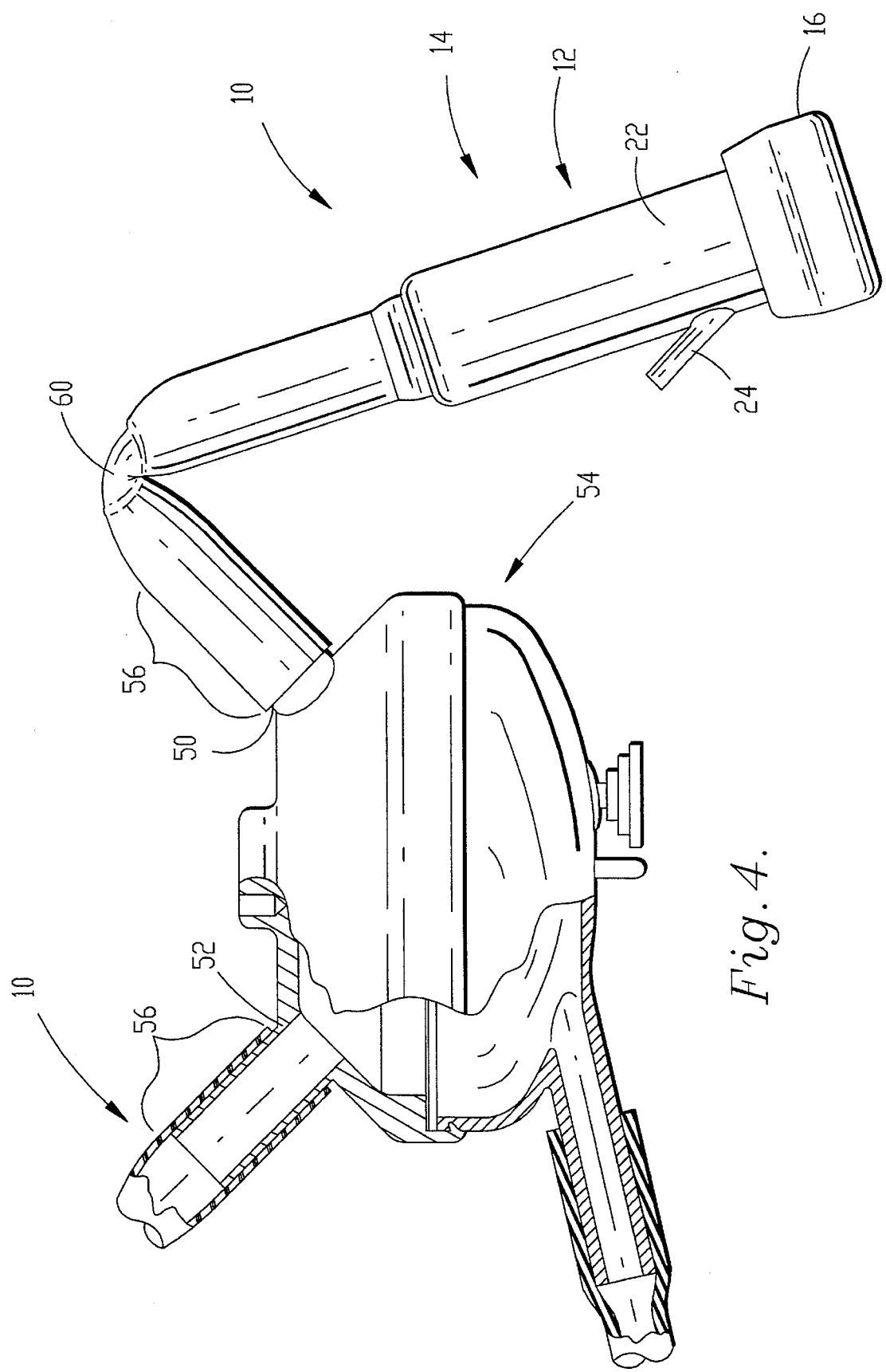
FIG. 4 is a side elevational view in partial section of a milk claw and teat cup assembly, showing the collapse of the reduced thickness segment of the connecting tube when the assembly hangs unsupported from the claw.

The connecting tube 20 surrounds channel 32 extending axially therethrough. A remote end 50 of the connecting tube is provided with an attachment region 56 adapted to be pulled over and thus connected to and supported by a short milk nipple 52 of a milk claw 54, as may be seen in FIG. 4. The connecting tube 20 also joins with the barrel 18 at junction 44. Intermediate the junction 44 and the remote end 50, the wall 58 of the connecting tube 20 presents a segment 60 of reduced stiffness or rigidity due to reduced tube wall thickness. The segment 60 preferably extends axially less than about two and more preferably less than about one interior diameter of the wall 58 of the connecting tube 20 in length. The thickness of the wall 56 in the segment 60 is preferably between about one-third to three-fourths the thickness of the adjacent portions 66 of the connecting tube 20. The segment 60 is also located sufficiently distant from the remote end 50 and spaced from the attachment region 56 where the connecting tube 20 engages the nipple 52, so that the segment 60 is not engaged by the nipple 52 of the milk claw 54 when the connecting tube 20 is fully installed and seated on the nipple, as shown in FIG. 4. Further, the segment 60 is also sufficiently spaced from the remote end 50 to prevent dragging of the mouthpiece 16 of the liner 10 on the ground when the claw 54 is positioned beneath the udder of the dairy animal to which one or more of the remaining liners 10 are attached. Thus, for typical cow milking operations, the segment 60 will be located at least about 50 mm from the remote end 50, and preferably about at least 65 mm from the remote end 50. On the other hand, the segment 60 is located sufficiently downwardly or away from junction 56 so as to permit the weight of the barrel 18 and mouthpiece 16 of the liner to cooperate with the weight of the shell 12 to create a moment arm sufficient to bend the connecting tube 20 at the segment 60 and thereby reduce the effective cross-sectional internal area of the channel 32 when the liner 10 is unconnected to a teat.

Figure 2:
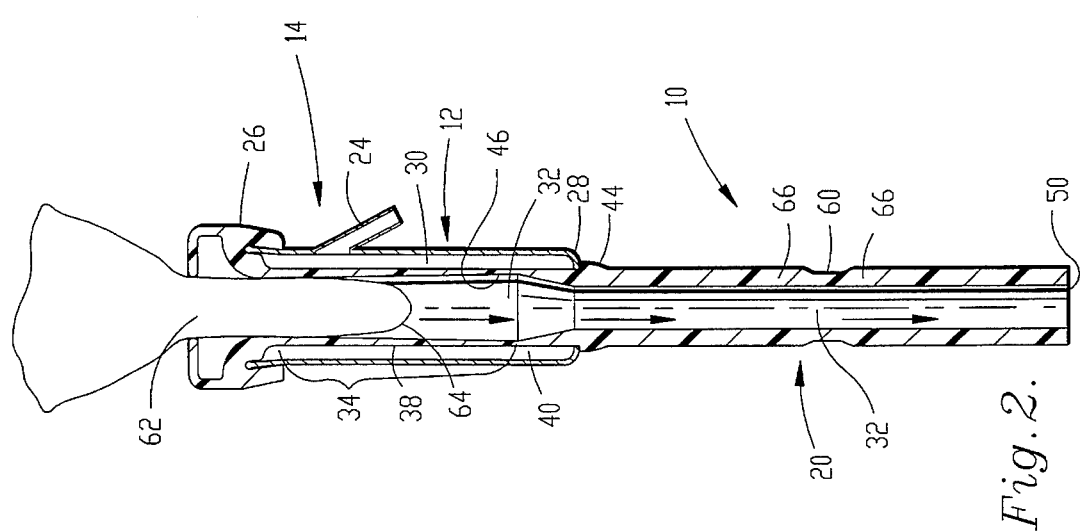
FIG. 2 is a vertical cross-sectional view similar to FIG. 1, showing the teat of a dairy animal inserted into the liner with the liner in an uncollapsed condition during a pulsation cycle of milking.
Figure 1:
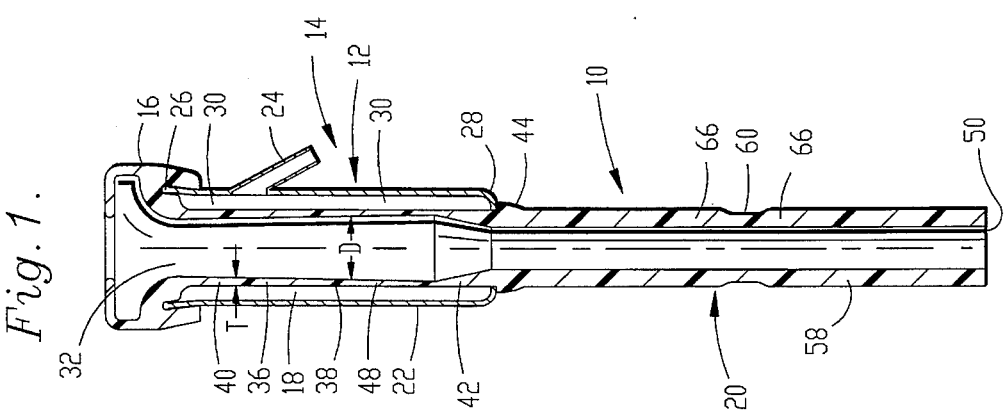
FIG. 1 is a vertical cross-sectional view of a teat cup assembly showing the teat cup liner hereof positioned in a conventional teat cup.

FIG. 2 illustrates the operation of the teat cup assembly 14 including the liner 10 hereof during the "liner open" portion of the pulsation cycle during milking. Vacuum is drawn by a vacuum pump or the like through a pulsator and then through a conduit connecting with the shell pulse tube. During the "liner open" portion of the pulsation cycle, vacuum is drawn both through the channel 32 and the shell pulse tube 24 so that the pressure in the pulsation chamber 30 is roughly equivalent and the liner barrel 18 is effectively open as shown in FIG. 2. It is to be understood that the mouthpiece 16 remains in sealing engagement with the teat 62 so that milk is extracted therefrom under the influence of a vacuum indicated by the arrow within the channel 32.

FIG. 3 illustrates the operation of the teat cup assembly 14 including the liner 10 hereof during the "liner closed" portion of the pulsation cycle. In order to effectively massage the teat 62 to provide maximum yield, the liner must also close around the teat 62. When closed, it is important that the barrel wall 36 collapse around the end 64 of the teat. Thus the entire surface of the teat is isolated from exposure to the vacuum. The liner 10 hereof effectively wraps around the teat end 64 of a large number of differently sized teats by providing a differential resistance to closure which decreases in a direction away from the mouthpiece 16. Thus, in the event of movement or elongation of the teat 62 within the liner 10, or when cows with different teat lengths are milked, the liner 10 effectively wraps around the teat 64 located in the teat-receiving region 34 to provide both a sealing engagement and reduce mastitis, chapping and other problems associated with a failure to conform to the animal's teat. By avoiding any stepping of wall thickness, the liner hereof is more able to conform to a variety of teat lengths, or an increase in teat length during milking.

FIG. 4 illustrates the effectiveness of the segment 60 in cutting off the flow of vacuum through the channel 32 when the liner 10 is not attached to the teat of a dairy animal. The flow of vacuum through the connecting tube 20 is substantially reduced or stopped by the segment 60. At the segment 60, the channel 32 substantially collapses during bending resulting from the reduced cross-sectional area of the channel which promotes reduced fluid flow therethrough. By bending of the connecting tube 20 in a predetermined region when the shell 12 is attached and the nipple of the claw 54 is in an upright orientation, the spacing of the segment 60 from the nipple will avoid damage to the wall 58 due to penetration by the end of the nipple. The configuration of the connecting tube 20 will still maintain a full and unrestricted open channel 32 for the passage of milk when the teat cup assembly 14 is attached to a cow's teat. Further, by predefining the position of crimping or bending to close off the channel 32, the dangling mouthpiece 16 may remain sufficiently spaced from the floor of the milking parlor to avoid undesirable contamination by the accumulated detritus thereon.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. In combination, at least one teat cup assembly including a shell and a teat cup liner having a mouthpiece, an intermediate barrel, and a connecting tube defining therein a milk-conveying channel, and a milk claw presenting at least one tubular nipple fludicially connected to said liner by said connecting tube at an attachment region located at a remote end of said connecting tube, wherein the improvement comprises a segment of reduced stiffness intermediate said attachment region and said barrel, whereby said segment is sufficiently weakened to allow the weight of the at least one teat cup assembly to bend at the segment and thereby substantially restrict the flow of fluid through said channel at said segment when the liner is otherwise unsupported and said at least one nipple is oriented in a generally upright position, said segment being sufficiently spaced from said attachment region to avoid engagement of said connecting tube with said at least one nipple at said segment during bending of said segment, wherein said connecting tube is integrally formed with said barrel, said connecting tube including a tubular wall, and said segment is defined by an area of said tubular wall having a reduced wall thickness.

2. The combination of claim 1, wherein said attachment region is of a length sufficient to locate said segment at least about 50 mm from the remote end.

* * * * *